United States Patent [19]
Knothe et al.

[11] 4,344,494
[45] Aug. 17, 1982

[54] MEASURING SYSTEM HAVING A BALANCE WITH DIGITAL DISPLAY HAVING DIGIT APPEARANCE MODIFYING CIRCUIT

[75] Inventors: Erich Knothe, Bovenden; Christoph Berg, Adelebsen; Franz-Josef Melcher, Hardegsen, all of Fed. Rep. of Germany

[73] Assignee: Sartorius GmbH, Goettingen, Fed. Rep. of Germany

[21] Appl. No.: 146,399

[22] Filed: May 5, 1980

Related U.S. Application Data

[63] Continuation-in-part of Ser. No. 900,642, Apr. 25, 1978.

[30] Foreign Application Priority Data

Apr. 27, 1977 [DE] Fed. Rep. of Germany ....... 2718769

[51] Int. Cl.³ .............................................. G01G 3/14
[52] U.S. Cl. .......................... 177/210 R; 177/DIG. 3
[58] Field of Search .......... 177/25, 50, 210 R, DIG. 3

[56] References Cited

U.S. PATENT DOCUMENTS

| | | | |
|---|---|---|---|
| 3,789,937 | 2/1974 | Strobel et al. | 177/210 |
| 3,826,319 | 7/1974 | Loshbough | 177/25 |
| 3,860,802 | 1/1975 | Knothe et al. | 177/25 X |
| 4,044,846 | 8/1977 | Matilainen | 177/DIG. 3 |
| 4,063,604 | 12/1977 | Rock | 177/25 |
| 4,149,605 | 4/1979 | Mettler et al. | 177/DIG. 3 |

Primary Examiner—George H. Miller, Jr.
Attorney, Agent, or Firm—Browdy and Neimark

[57] ABSTRACT

A balance is provided with a digital readout, a display device and transfer device for transferring measured values to the display device at a selected frequency. The frequency can be varied. An accessory circuit is provided for modifying at least the last digit appearing on the display device in response to an arrest criterion or a condition of the balance, such as an open measuring chamber or position of a draft shield. The criterion can be developed from comparing successive measured values.

28 Claims, 4 Drawing Figures

MEASURING SYSTEM HAVING A BALANCE WITH DIGITAL DISPLAY HAVING DIGIT APPEARANCE MODIFYING CIRCUIT

CROSS REFERENCE TO RELATED APPLICATION

This application is a continuation-in-part of the application of Knothe et al, Ser. No. 900,642, filed Apr. 25, 1978 and entitled "Balance with Digital Display Having Digital Appearance Modifying Circuit", the application being incorporated herein in its entirety.

BACKGROUND OF THE INVENTION

This invention relates to an improvement in a balance having a digital display, with a measuring device producing measured values continuously, and in which the measured values are transferred to the display at a present frequency.

In conventional balances with optical projection and display of a scale, an operator cannor read the display while the balance is moving. The magnified numbers in the display, produced on a transparent screen, appear on this screen as changing, blurred shadows, from which the displayed measured value cannot be deciphered. Hence, addition of material being weighted must be interrupted occasionally to allow the balance to assume a resting position and to permit the displayed measured value to be read exactly. This is time consuming.

Hence, it is known from Swiss Patent 213,453 to provide mechanical balances with optical projection with an additional mechanical readout as a monitoring display and weighing accessory circuit; alternatively, a special marking can be provided on the projected scale, for example, a diagonal line as known Swiss Patent 365,554. In this way, at least a rough indication of the measured value at a given moment can be determined during weighing, in other words, when the displayed measured value is changing rapidly.

It is also known from the German Utility Model 6,901,976 to provide in mechanical balances a digital monitoring display by using a suitable grid.

A particular disadvantage of these mechanical and analog displays is the inertia of the indicator, which results in overshooting the measurement point. In addition, two separate displays are required, thus increasing the design and construction cost.

Furthermore, it is known from the German Utility Model 6,806,498 to provide an analog display with low resolution as a weighing accessory for electronic balances in addition to the digital display. This allows the magnitude and direction of the change in the measured value to be recognized more easily, so that adjustment or compensation of a measured value is facilitated.

Finally, a display has been proposed for a monitoring readout on a balance, wherein a display element is provided which is a schematic respresentation of the weighing system design which is optically visible, taking the form of a relatively long narrow glowing strip, whereby the design of the weighing system is illustrated by the geometric shape of the strip.

A disadvantage of this use of an additional analog display in addition to the digital display for electronic balances is again the fact that two separate and separately controllable displays must be provided. Moreover, the analog display has insufficient accuracy, since only 10 to 100 increments can be shown on the strip by contrast with $10^4$ and $10^6$ increments for a digital display.

SUMMARY OF THE INVENTION

It is a principal object of the present invention to provide an improvement in a measuring system having a weighing accessory circuit of the type initially described above, wherein the above-mentioned disadvantages do not occur.

In particular, a weighing accessory circuit is to be provided, wherein a second readout is not needed as a monitoring readout. This aim and effect is achieved according to the present invention by virtue of the fact that when the weighing accessory circuit is switched on, at least the last digit of the displayed measured value differs from the other digits being displayed.

By the term "different" is meant that at least the last digit of the displayed measured value is characterized in some optically perceptible fashion. For example, at least the last digit of the displayed measured value in the display can be blanked or can appear darker than the other digits. Alternatively, the last digit of the displayed measured value can be marked differently than the other digits, for example, with an asterisk, a dot or another symbol, or can be underlined, for example. Finally, it is also possible to make the last digit of the displayed measured value a different color than the other digits.

The foregoing object, as well as others which are to become clear from the text below, are achieved by providing an improved measuring system, which includes a balance, analog-to-digital converter responsive to output of the balance for developing digital signals representative of weight, a counter arrangement responsive to output from the converter means, a measuring display device for continuously showing measured values and circuitry coupled between the counter and the display device for transferring measured values at at least one predetermined frequency to the display device. The improvement is characterized in that the circuitry includes an accessory circuit, which modifies at least the last digit appearing on the display device to distinguish it optically from the other digits, and a switch, coupled to the accessory circuit for selectively activating the accessory circuit arrangement.

The improved measuring system preferrably includes a central processor for blanking out at least the last digit of the measured value shown on the display device.

The improved measuring system could include a central processor for making at least the last digit of the measured value shown on the display device appear darker than the other digits.

The improved measuring system could include a central processor for making at least the last digit of the measured value shown on the display device to be marked differently optically than the other digits.

The improved measuring system could include a central processor for making at least the last digit shown on the display device to be a different color than the other digits.

The improved measuring system could have a circuit arrangement for transferring the measured values to the display device which is switched to a higher frequency of operation whenever the accessory circuit is activated.

The advantages achieved by the present invention rest in particular on the fact that only one display is required, in other words, the operator is not required to shift his/her glance either during measurement or weighing. Since the monitoring display is also controlled by the measuring device, it functions in an inertialess manner like the latter; in other words, the monitoring display responds extremely rapidly to changes in the measured value as they occur during weighing. Finally, no expensive additional components are required, while the characterization of the digit or the digits in the displayed measured value affected by the weighing is accomplished using a simple circuit.

As mentioned above, the important disadvantage of electronic balances during weighing resides in the fact that there are a great many rapidly changing digits. This disadvantage can be avoided by employing the measures outlined above.

Another disadvantage of electronic balances is the excessive low repetition rate of the display, in other words weighing carried out jointly by an operator and a balance procceeds too slowly. Thus, the normal display repetition frequency is 1 to 2 Hz; in other words, only 60 to 120 changes in the display per minute are possible. This creates problems if the change in weight during the weighing process must be followed more exactly.

According to an especially advantageous embodiment, the frequency of the transfer of the measured value to the display is increased when the weighing accessory is switched on.

During the weighing procedure, the display repetition frequency can be 5 to 10 Hz for example, in other words 300 to 600 changes in the display occur each minute during weighing. This allows the change in weight to be followed more accurately during the weighing procedure; in other words, the operator obtains a rapid, yet more reliable monitoring readout of the material being weighed which has just been placed on the balance.

In order to save the operator additional procedures, the weighing accessory should be turned on and off automatically, for example, in the case of an analytical balance, by opening and closing the weighing chamber or, in the case of top-loading balances, by removing and installing the draft shield.

Alternatively, the weighing accessory can also be turned off and on automatically by providing an arrest criterion, determined by digital or analog techniques.

A method of digital arrest monitoring, i.e. determination when a measured value continuously produced by a measuring instrument has reached a constant value after a sudden change, is known from German Patent 2,250,793. Successive measured values are compared with one another, and one of these measured values is displayed when the measured values differ from one another by less than a predetermined differential; otherwise, comparison with additional measured values is repeated until the differential criterion is satisfied. Three successive measured values are compared with each other and one of these measured values is displayed if two of the values differ from one another by less than a predetermined differential.

Another method for generating signals for arrest monitoring of an electrical measured value indicator by comparison of at least two measured-value periods during which a certain number of sub-measurements are made, has been proposed in the older German Patent Application Ser. No. P 26 17 435.6 of the assignee. In this method, summation of a certain number of submeasurements and hence a measured-value period begins at a point in time at which at least two submeasurments of the specified number of submeasurements are equal or at least fall below a predetermined narrow tolerance limit, for example, have less than two digits.

The number of digits which vary depends in particular upon the nature of the material being weighed and the rate at which it is added. In the case of very fine-grained material and slow addition, for example, only the last digit in the displayed measured value may change and, therefore, as described above, should be characterized, while in the case of coarsegrained material or rapid feed, the last three digits would change, for example, and would, therefore, have to be marked.

If a balance is designed primarily for a specific weighing task, it is advantageous to predetermine the number of digits to be displayed optically, in other words, to mark the last three digits automatically, for example when the weighing acceessory is switched on.

Alternatively, it is also possible to control the number of digits to be marked in the displayed measured value by means of an arrest criterion which, as mentioned above, can be determined by digital or analog means. The two methods described above are suitable for this purpose.

BRIEF DESCRIPTION OF THE DRAWINGS

The invention is described hereinbelow with reference to embodiments shown in the attached schematic diagrams.

DETAILED DESCRIPTION OF THE PREFERRED EMBODIMENTS

Figure 1:
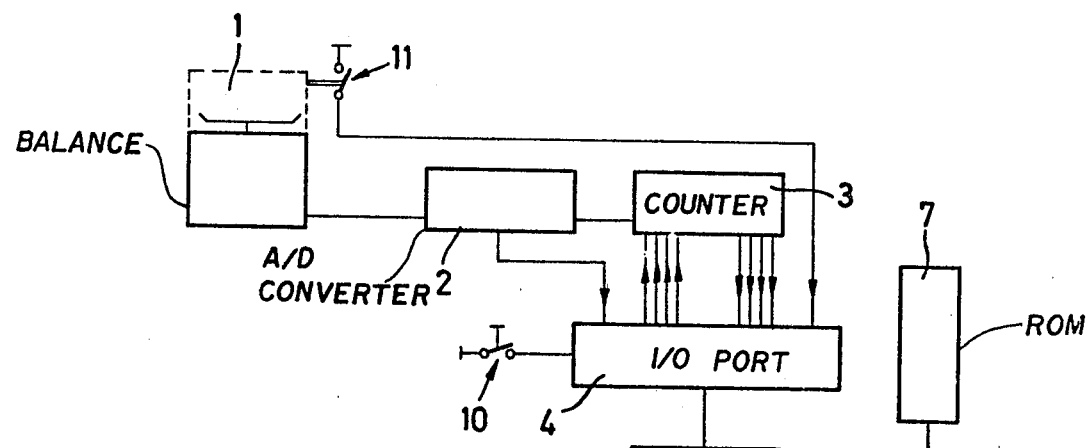
FIG. 1 is a block diagram of a weighing accessory circuit according to the invention.

FIG. 1 shows a balance 1 which generates a weigh-proportional analog measurement signal; the analog measurement signal is digitized in an analog/digital converter 2 and fed to a counter 3.

The counter 3 reading is controlled periodically via an input/output (I/O) port 4, from a central processing unit (CPU) 5, fed to a random access memory (RAM) 8 and stored therein. The I/O port 4 represents the connection between the CPU 5, generally consisting of a microprocessor, and the measurement portion of the balance.

The measured value stored in the RAM 8 is fed through an input/output (I/O) port 6 to a display 9, while an additional measured value is being determined.

If a unit represented diagrammatically by a switch 10 gives a tare command, an additional memory location in the memory, shown schematically as read-only memory (ROM) 7 receives the measured value and the latter is subtracted from all subsequent measured values, with the difference being stored in each case as a new measured value and displayed on the display 9.

A switch 11 is provided on the balance 1 which is actuated, for example, by opening and closing the weighing chamber.

The switch 11 is closed when the weighing chamber is open and thereby turns on the weighing accessory circuit.

Figure 2:
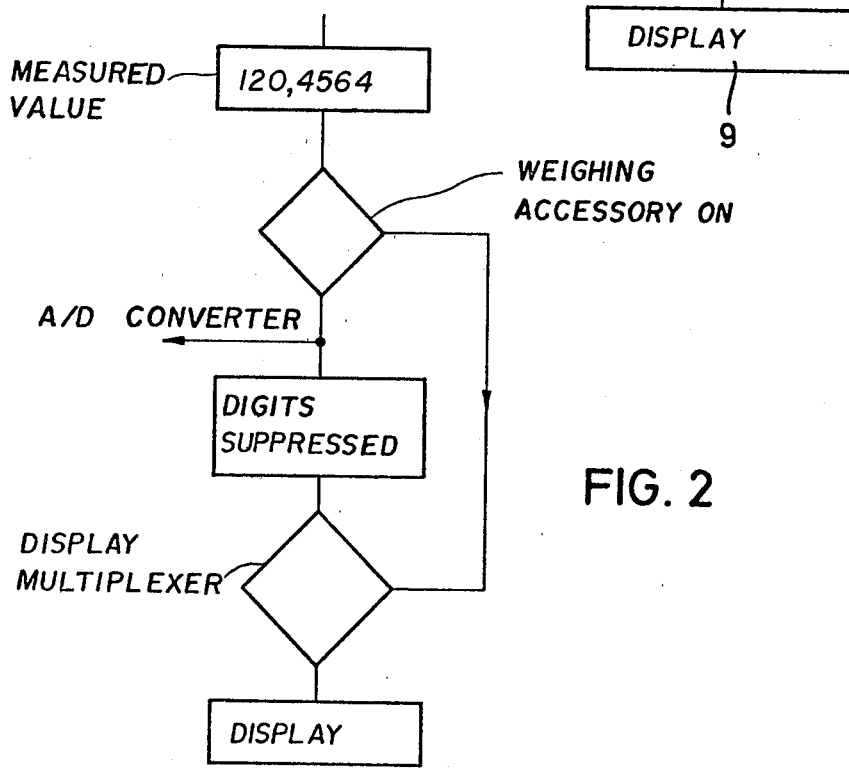
FIG. 2 is a flow chart to explain the procedure involved in suppression of considerably varying digits.

In the following test, a first embodiment of the weighing accessory circuit according to FIG. 1 will be described with refrerence to the flow chart in FIG. 2.

When the weighing chamber is opened, the switch 11 on the balance 1 is closed, whereby the central processing unit 5 receives an appropriate signal through the I/O port 4. Then the last two decades of the transmitted measured value, i.e. the digits 6 and 4 in FIG. 2 are blanked. Simultaneously the display repetition rate is increased, in other words, more measured values are transferred to the display 9 per unit time. During weighing, therefore, only measured value 120.45 appears on the display 9.

One embodiment of the invention in which an arrest criterion is used to control the number of digits to be suppressed is described hereinbelow with reference to the flow chart in FIG. 3.

In this embodiment, which is preferably used in toploading balances, two or more successive measured values are compared continuously with one another. Depending on the magnitude of the difference, a varying number of measured decades are blanked out or marked in some optically perceptible fashion.

Hence, a test is conducted first of all, for example, to determine whether the difference between two successive measured values is less than or greater than 100. If the difference is greater, a signal is transmitted to the A/D converter and the weighing accessory circuit then operates at maximum display repetition rate. At the same time the last two digits in the displayed measured value are blanked out or marked in some other way, so that the display reads 120.45 XXg, ror example.

If the difference is less than 100, a check is made to determine whether the difference between two successive measured values is greater than or less than 10. If the difference is greater than 10, a signal is sent to the A/D converter so that the display operates at a medium display repetition rate. At the same time, the last digit in the measurement result displayed is suppressed or marked, so that the readout shows 120.456 Xg, for example.

If the difference between two successive measured values is less than 10, this means that the measured value had stabilized. The weighing accessory circuit is then automatically deenergized or disconnected and the stationary measured value, for example 120.4564 g appears on the display.

If all of the digits after the decimal point are shifted during the weighing in, only the measured value 120 g would appear. As the weighing-in process slows down, more and more digits in the measured value stabilize, in other words, more and more digits after the decimal point are added to the displayed measured value until, when the measured value finally becomes constant, the latter can be displayed with complete resolution.

Depending on the increase in resolution, the display repetition rate is reduced so that the lowest display repetition rate is employed for displaying the total measured value, in other words, the longest integration of the measured value.

Figure 4:
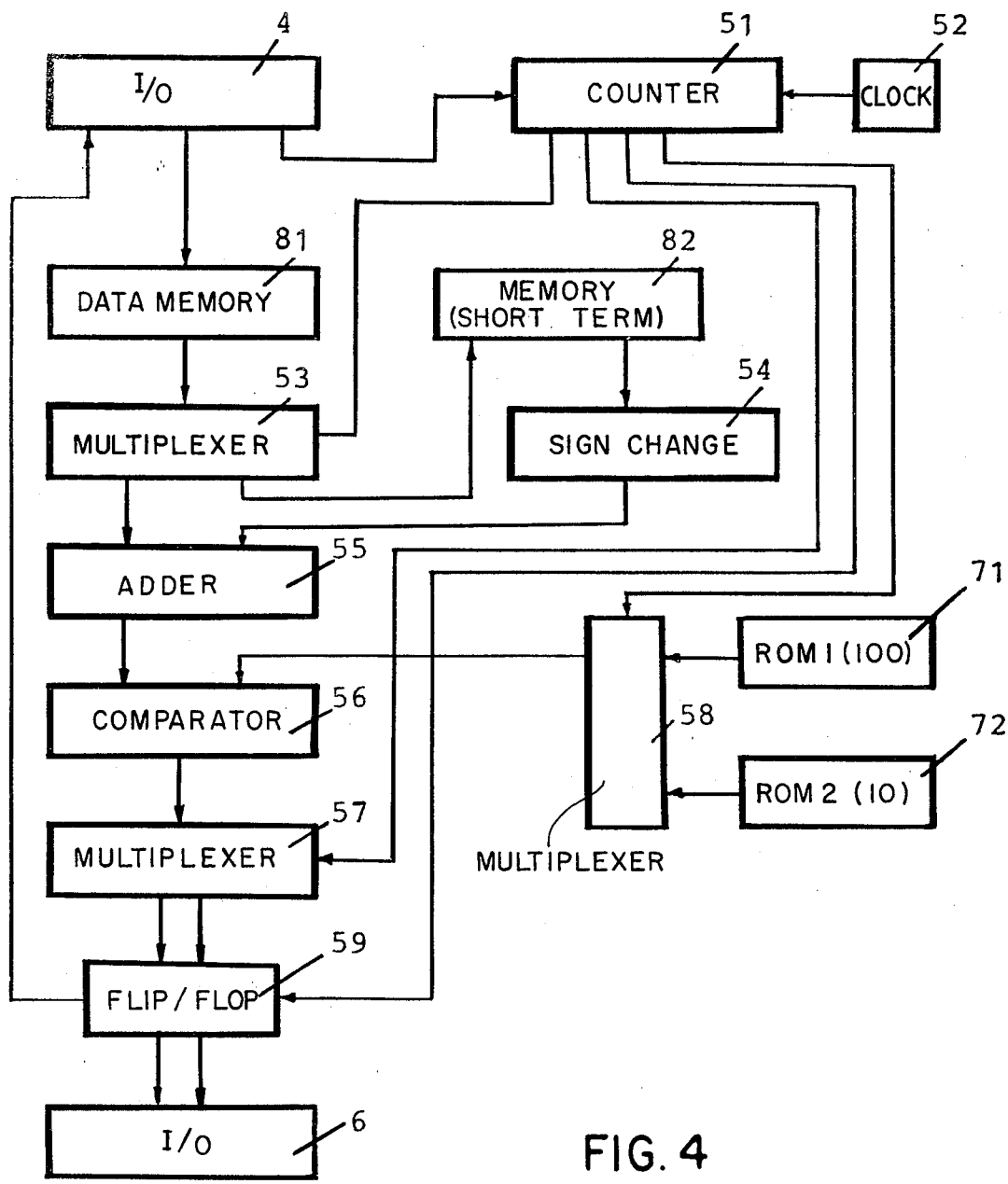
FIG. 4 is a block diagram of a weighing accessory circuit according to FIG. 1, in which the circuits are shown in a more detailed form to effect the function of the flow chart of FIG. 3.

In FIG. 4, the units 4,5,6,7 and 8 of FIG. 1 are displayed in separate blocks. A connection leads from the I/O port 4 to a program counter 51 and another connection to a data memory 81. From the data memory 81 a connection leads to a multiplexer 53, which on the one hand is connected with a memory 82 and on the other hand with an adder 55. A connection leads from the memory 82 to a complementer 54 and from there to another input of the adder 55. The adder 55 is connected with a comparator 56, and this is connected with a multiplexer 57. The multiplexer 57 is connected by two lines with a flip-flop 59, which, in turn, is connected by two lines with the I/O port 6.

The program counter 51 is driven by a clock 52 and is connected by control lines with the multiplexer 53, the multiplexer 57, the flip-flop 59 and a multiplexer 58, which is connected with two fixed value memories 71 (ROM 1) and 72 (ROM 2). In addition, a line leads from the multiplexer 58 to the comparator 56, while a control line leads from the flip-flop 59 to the I/O port 4.

Figure 3:
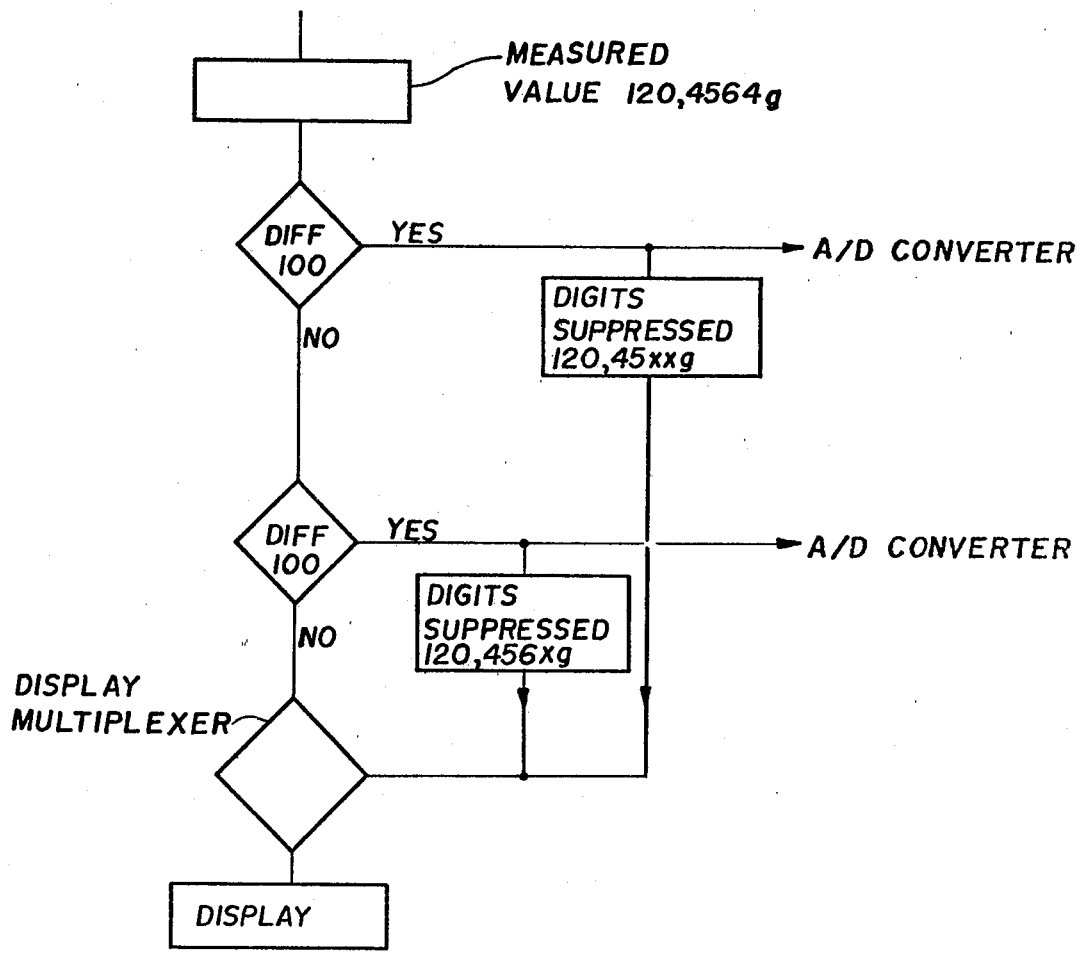
FIG. 3 is a flow chart to explain the technique involved in suppression of considerably varying digits as well as changing the display repetition frequency as a function of the determination of an arrest criterion.

As discussed above, two or more measured data are compared with each other continuously in the embodiment according to the flow diagram of FIG. 3, in order to gain a static value from their difference, and the greatly varying parameters are being measured, but not displayed, according to the size of these differences.

The program counter 51 is started by the A/D converter 2, shown in FIG. 1, and is timed by the clock 52. A measured datum, generated and waiting in the counter 3, shown in FIG. 3, is passed on from the I/O port 4 to the data memory 81, from which it is routed by way of the multiplexer 53 to the adder 55.

The measurement datum immediately preceding had previously been stored in the memory 82 and is now also routed at the same time via the complementer 54 to the adder 55. The adder 55 now determines the difference between the last measured datum and the datum measured in the previous measuring step, this difference value being passed on to the comparator 56 by the adder 55.

During the next step, the first constant, stored in the fixed value memory 71 (ROM 1) and, in a case, being 100, is passed on via the multiplexer 58 to the comparator 56. The latter determines, whether the difference value is larger or smaller than the constant. If the difference value is larger, this difference is immediately passed on to the flip-flop 59 via the multiplexer 57, which controls the display 9 via the I/O port 6 and the A/D converter 2 via the I/O port 4. According to the flow diagram of FIG. 3, the measuring accessory circuit is switched on with a maximum display repetition rate, while at the same time the last two digits of the measured value are displayed in the alternative mode, that is the entire value is measured, but the last two digits are not displayed.

If the difference value is smaller than the first constant, the second constant, stored in the second fixed value memory 72 (ROM 2), in the present case the number 10, is brought to the comparator 56 via the multiplexer 58. The result determined by comparator 56 is passed via the multiplexer 57 to the flip-flop 59, which in turn controls the display 9 via the I/O port 6 or the A/D changer via the I/O port 4.

If the difference value is larger than the second constant, the measuring accessory circuit is switched on with medium display repetition rate, according to the flow diagram of FIG. 3 and, at the same time, the last digit of the displayed measured value is suppressed. However, if the difference value is also smaller than the second constant, then this means, according to the example of FIG. 3, that the measured value has been sufficiently stabiliazed and the measuring accessory circuit is automatically disconnected, while all digits of the display are shown.

During the process the last determined measured value is constantly being passed from the multiplexer 53 to the memory 82, where it is stored until the next comparison.

The microprocessor type Intel 8880 of Intel Corporation, 3065 Bowers Avenue, Santa Clara, CA, is satisfactory for use as central processing unit 5 and can be simply programmed by one of ordinary skill in the art for any necessary mode of usage.

It will be obvious to those skilled in the art that various changes may be made without departing from the scope of the invention and the invention is not to be considered limited to what is shown in the drawings and described in the specification.

It is to be appreciated that the embodiments described above and shown in the drawings are set out by way of example, not by way of limitation. Numerous other embodiments and variants are possible without departing from the spirit and scope of the invention, its scope being set out in the appended claims.

What is claimed is:

1. In a measuring system adapted to weigh changing amounts of material, the system which includes a balance, analog-to-digital converter means responsive to output signals from the balance for producing digital signals representative of weight, counter means responsive to said output signals from said converter means, a measuring display device for continuously showing measured values and circuit means coupled between said counter means and said display device for transferring measured values at at least one predetermined frequency to the display device, the improvement wherein said circuit means includes accessory circuit means for modifying at least the last digit appearing on said display device to distinquish it optically from the other digits, switch means coupled to said accessory circuit means for selectively activating said accessory circuit means, and said circuit means comprising means to change said frequency in accordance with the speed at which the amount of material being weighed is changing as the weighing is being done.

2. An improved measuring system according to claim 1, wherein said accessory circuit means includes central processor means for blanking out at least the last digit of the measured value shown on said display device.

3. An improved measuring system according to claim 1, wherein said accessory circuit means includes central processor means for making at least the last digit of the measured value shown on said display device appear darker than the other digits.

4. An improved measuring system according to claim 1, wherein said accessory circuit means includes central processor means for making at least the last digit in the measured value shown on said display device to be marked differently optically than the other digits.

5. An improved measuring system according to claim 1, wherein said accessory circuit means includes central processor means for making at least the last digit shown on said display device to be a different color than the other digits.

6. An improved measuring system according to claim 1, wherein said circuit means for transferring the measured values to said display device is switched to a higher frequency of operation whenever said accessory circuit means are activated.

7. An improved measuring system according to claim 1, wherein said accessory circuit means includes central processor means for modifying a predetermined number of continuously successive digits shown on said display device beginning with the last digit, so as to distinguish optically such digits from the other digits.

8. An improved measuring system according to claim 1, wherein said switch means for selectively switching comprise means for automatically switching.

9. An improved measuring system according to claim 8, wherein said balance includes a weighing chamber and said switch means are automatically switched on in response to opening of said chamber.

10. An improved measuring system according to claim 8, wherein said balance includes a draft shield and said switch means are automatically switched on in response to removal of said draft shield.

11. An improved measuring system according to claim 8, including analog means for developing arrest criterion and said switching means are automatically switched on and off by the arrest criterion developed by said analog means.

12. An improved system according to claim 11, wherein said circuit means responds to the magnitude of deviation from the arrest criterion for determining the frequency of operation of transfer of the measured values to said display device.

13. An improved measuring system according to claim 11, wherein said circuit means responds to the magnitude of deviation from the arrest criterion for determining the number of optically distinctive digits shown on said display device which are to be changed.

14. An improved measuring system according to claim 8, including means for developing digitally determined arrest criterion and said switch means are automatically switched on and off under control of the digitally determined arrest criterion.

15. An improved measuring system according to claim 14, wherein said circuit means responds to the magnitude of deviation from the arrest criterion for determining the frequency of transfer of the measured values to said display device.

16. An improved measuring system according to claim 14, wherein said circuit means is responsive to the magnitude of deviation from the arrest criterion for determining the number of optically distinctive digits shown on said display device which are to be changed, the number being changed in more than one step.

17. An improved measuring system according to claim 16, wherein said circuit means compares at least two successive measured values to develop the arrest criterion, said accessory circuit means being activated and deactivated as a function of the difference between the measured values.

18. An improved measuring system according to claim 16, wherein said circuit means compares three successive measured values for developing the arrest criterion, said accessory circuit means being deactivated if two of the measured values differ from one another by less than a predetermined differential and activated when the differential condition is exceeded.

19. A method of displaying measured weight values of changing amounts of material being weighed, comprising the steps of weighing while the amount of material is changing during the weighing process, producing digital signals corresponding to the weights of the material at successive instants of time during said process, comparing each successive two such digital signals corresponding to weights of the material at two successive such instants of time to determine the difference between each successive two such digital signals, generating a signal corresponding to each such difference, comparing each such difference signal to a signal corresponding to a first constant corresponding to a larger significant portion of the weight value; then either displaying the latest measured value if said difference is more than said constant and continuing to operate the method at a first predetermined frequency, or if said difference is less than said first constant, then comparing said measured value to a second constant which is smaller than said first constant and then operating the method at a second predetermined frequency if said difference is between said constants or at a third predetermined frequency if said difference is less than said second constant; delivering said measured values to digital display means, and optically distinquishing varying numbers of the digits displayed on said display means in accordance with the said first, second and third predetermined frequencies of operation respectively, whereby increasing numbers of digits of the display are blocked or otherwise distinquished with increases in speed of the change of amount of material to be weighed, and whereby changes in said frequency can be made each time a difference signal is generated.

20. The method of claim 19, wherein said larger constant is 100 and said other constant is 10, and optically distinquishing the digits of the optical display beginning with the least significant digit and working towards the more significant digits.

21. The method of claim 19, wherein said step of optically distinguishing comprises blanking out at least the last digit of the measured value shown on said display means.

22. The method of claim 19, wherein said step of optically distinguishing comprises the step of making at least the last digit of the measured value shown on said display means appear darker than the other digits on said display means.

23. The method of claim 19, where said step of optically distinguishing comprises making at least the last digit in the measured value shown on said display means to be marked differently optically then the other digits shown on said display means.

24. The method of claim 19, wherein said step of optically distinguishing comprises the step of making at least the last digit shown on said display means a different color than the other digits shown on said display means.

25. The method of claim 19, and the step of developing a digitally determined arrest criterion, and automatically operating the means performing the method on and off under the control of said digitally determined arrest criterion.

26. The method of claim 19, and the step of using analog means for developing an arrest criterion and automatically operating the means performing the method on and off by said arrest criterion.

27. The method of claim 25 or 26, and the step of using the magnitude of deviation from the arrest criterion for determining the number of optically distinctive digits to be shown on said display means which are to be changed.

28. The method of claim 25 or 26, and the step of using the magnitude of deviation from the arrest criterion for determining the frequency of delivering of measured values to said display device.

* * * * *